United States Patent [19]
Ruhovets

[11] Patent Number: 4,617,825
[45] Date of Patent: Oct. 21, 1986

[54] WELL LOGGING ANALYSIS METHODS FOR USE IN COMPLEX LITHOLOGY RESERVOIRS

[75] Inventor: Naum Ruhovets, Houston, Tex.

[73] Assignee: Halliburton Company, Duncan, Okla.

[21] Appl. No.: 775,294

[22] Filed: Sep. 12, 1985

[51] Int. Cl.$^4$ .............................................. G01V 5/00
[52] U.S. Cl. ..................................... 73/152; 364/422; 250/256; 250/269
[58] Field of Search ......................... 73/152; 364/422; 250/256, 269

[56] References Cited

U.S. PATENT DOCUMENTS

| | | | |
|---|---|---|---|
| 3,453,433 | 7/1969 | Alger et al. | 250/269 X |
| 3,590,228 | 6/1971 | Burke | 364/422 X |
| 3,930,154 | 12/1975 | Scott | 250/270 |
| 4,492,863 | 1/1985 | Smith, Jr. | 250/256 |
| 4,531,188 | 7/1985 | Poupon et al. | 364/422 |

OTHER PUBLICATIONS

Poupon, A. et al., Log Analysis in Formations with Complex Lithologies, Jour. of Pet. Tech., Aug. 1971, pp. 995–1005.

Primary Examiner—Stephen A. Kreitman
Assistant Examiner—Scott M. Oldham
Attorney, Agent, or Firm—W. J. Beard

[57] ABSTRACT

Advanced analytic methods and formulas have been developed for 2- and 3- mineral solutions in complex lithology reservoirs. Required logs are density, neutron, acoustic, and photoelectric absorption index (PE curve). On the basis of developed mathematic models of complex reservoirs the limitations and maximum possible errors in the determination of porosities and lithologic compositions are presented for each method. In most cases, the formulas developed are simple enough to be used with programmable calculators.

3 Claims, 4 Drawing Figures

Figure 1. Density - Compensated Neutron Crossplot

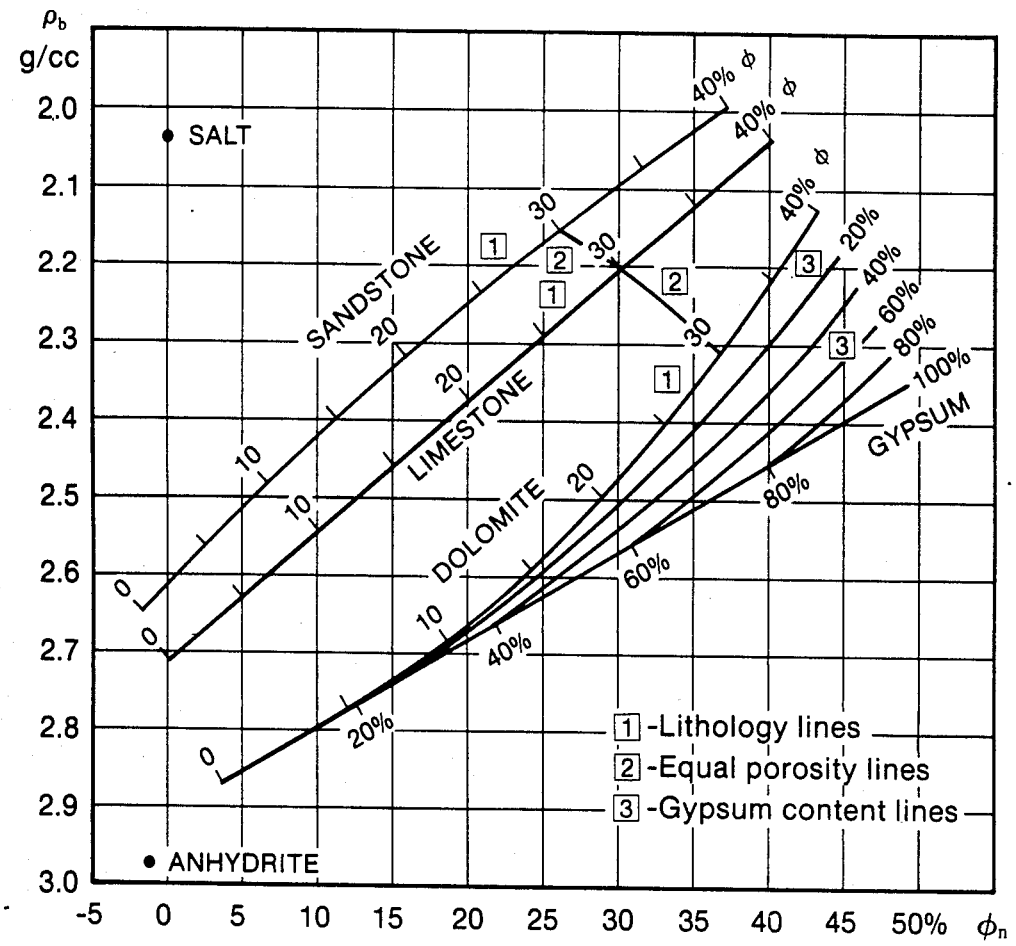
Figure 1. Density - Compensated Neutron Crossplot

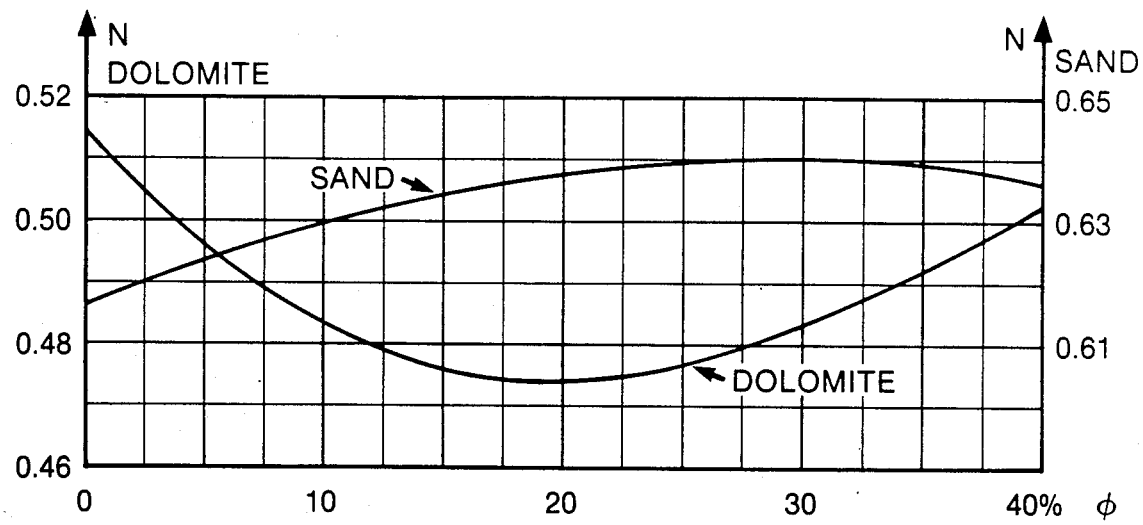
Figure 2. Lithology Parameter N - Porosity Relationship
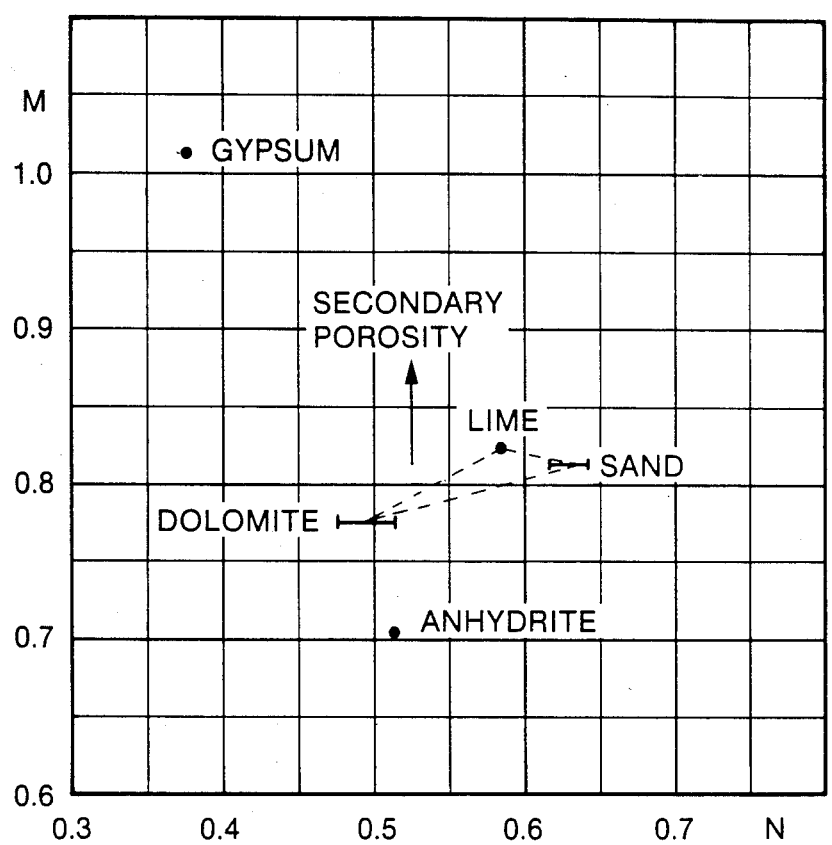
Figure 3. M-N Lithology Plot (Compensated Neutron)

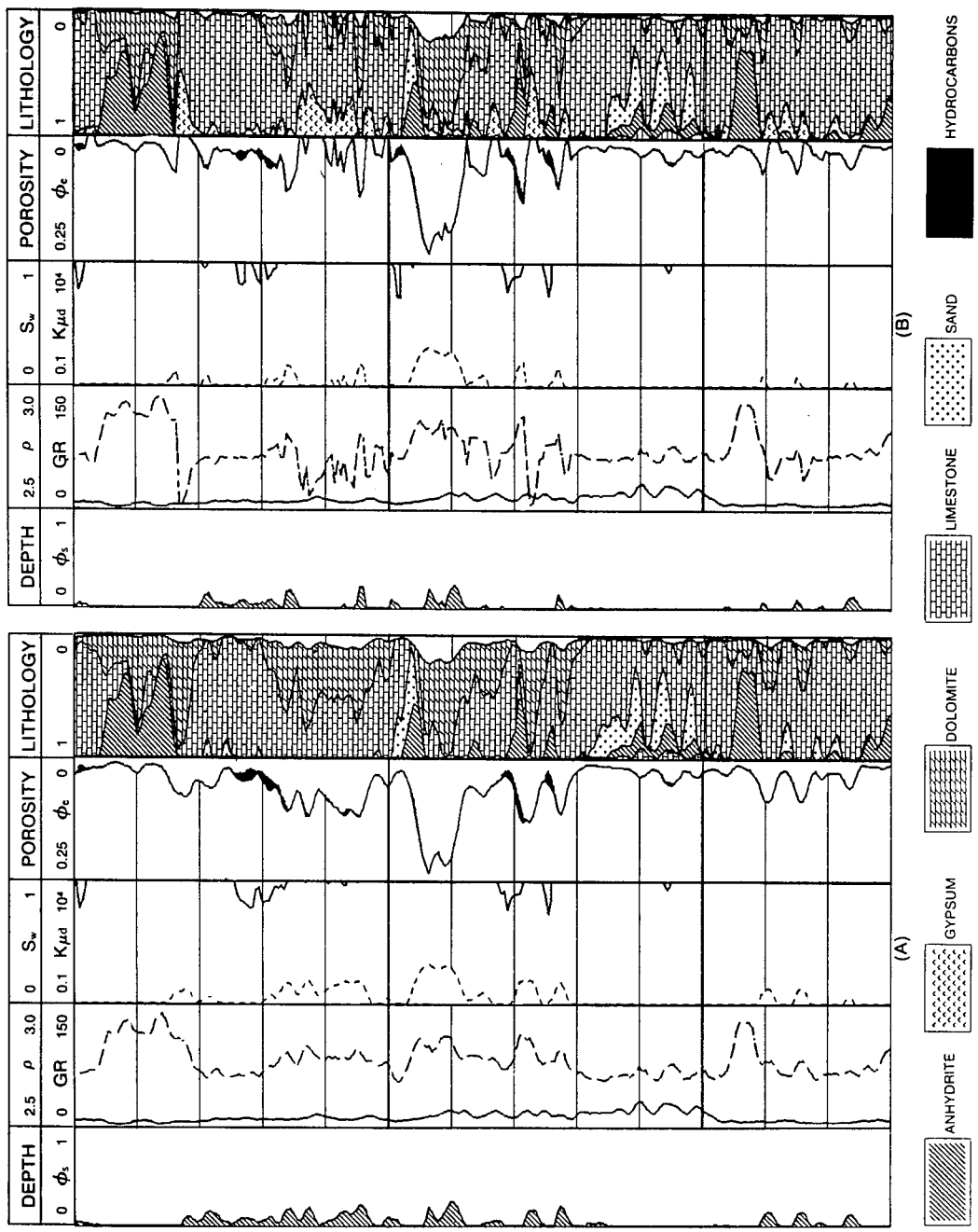
Figure 4. Log Interpretation Example
(a) with density, neutron and acoustic logs
(b) with density, neutron, acoustic logs and Pe index

WELL LOGGING ANALYSIS METHODS FOR USE IN COMPLEX LITHOLOGY RESERVOIRS

BACKGROUND OF THE INVENTION

The present invention relates to methods for well log analysis and more particularly for the log analysis of complex lithology reservoirs based on density, neutron, acoustic and photoelectric absorption index measurements.

Complex lithology reservoir evaluation encounters many difficulties in situations when porous rocks such as sandstone, limestone and dolomite are combined with non-porous materials such as gypsum and anhydrite simultaneously. When the formation contains a considerable volume of non-porous material, the estimation of lithological composition is especially important for accurate determination of effective formation porosities. The analytical solution of mathematical models can be used in computerized log evaluation of complex reservoirs. In most cases, the formulas developed are simple enough to also be used by hand programmable calculators.

Studies have indicated that in the mathematical modelling of complex reservoirs not all problems encountered in the log interpretation of these reservoirs may have a unique solution. This is primarily due to the limitations of presently available suites of well logs. New methods and formulae as well as a discussion of the limitations and accuracy of this type of analysis will enable the well log analyst to perform better the evaluation of complex reservoirs and will also assist in determining when satisfactory solutions can be obtained from the well logging data or when addition information such as core data maybe needed.

Prior art publications (such as Poupon, Hoyle and Schmidt "Log Analyst and Formations with Complex Lithologies"; J. Petroleum Technology, August 1971, pp. 995–1005 and Raymer and Biggs "Matrix Characteristics Defined by Porosity Computations" SPWLA Fourth Annual Symposium 1963) have described comprehensive methods of correcting logs and porosities in complex reservoirs for the presence of shale. In the method of the present invention, it will be assumed that either the reservoir rocks are shale-free, or that corrections for shale have been made according to methods developed by these authors in the prior art.

BRIEF SUMMARY OF THE INVENTION

The techniques and methods of the present invention disclose methods for using well logging measurements made with acoustic, density, neutron, and photoelectric absorption index well logging systems and methods for combining crossplots of these logs and comparing the results with mathematically derived models having analytic solutions in order to interpret the logs for the presence of non-porous material such as gypsum and anhydrite being mixed with porous materials such as sandstone, limestone and dolomite in the complex reservoirs. The techniques of the present invention may be implemented on digital computers by programs for applying the solution techniques according to the present invention to the well logging data gathered in the operation of logging these wells.

The invention may best be understood by reference to the following detailed description thereof when taken in conjunction with the accompanying drawings, in which:

BRIEF DESCRIPTION OF THE DRAWINGS

FIG. 1 is a graphical representation crossplot showing density and compensated neutron porosity.

FIG. 2 is a graphical plot showing the lithology parameter N as a function of porosity.

FIG. 3 is a graphical representation showing an M-N lithology plot and

FIG. 4 is a schematic representation showing a log interpretation example presentation in a complex lithology reservoir according to concepts of the present invention.

DESCRIPTION OF THE PREFERRED EMBODIMENTS

Techniques have been developed and implemented to determine the density ($\rho_b$), neutron ($\phi_n$), acoustic ($\Delta_t$), and photoelectric (Pe) responses in complex reservoirs with varying lithological compositions, porosities, and fluid saturations.

It is customarily accepted that the density and acoustic log responses in complex reservoirs can be expressed as $$\rho_b = \rho_{ma} \cdot (1 - \phi_e) + \phi_e \cdot \rho_{ef} \quad (1)$$

$$\Delta_t = \Delta t_{ma} \cdot (1 - \phi_e) + \phi_e \cdot \Delta t_f \quad (2)$$

where $\rho_{ma}$ and $\Delta t_{ma}$ are the average matrix density and travel time of all components in the reservoir. This equation is valid, however, when only porous materials are present and porosity is uniformly distributed between the components. If the reservoir is composed of both porous (such as sand, lime, and dolomite) and non-porous (such as gypsum and anhydrite) components, the density log response should be computed as $$\rho_b = \rho_{map}(1 - V_{nt} - \phi_e) + \rho_{man} \cdot V_{nt} + \phi_e \cdot \rho_{ef} \quad (3)$$

where:

$$\rho_{map} = \frac{\Sigma(\rho_{mp} \cdot V_p)}{V_{pt}} \quad (4)$$

$$\rho_{man} = \frac{\Sigma(\rho_{mn} \cdot V_n)}{V_{nt}} \quad (5)$$

Then:

$$\rho_b = \rho_{map} \cdot V_{pt} - \rho_{map} \cdot \phi_e + \rho_{man} \cdot V_{nt} + \phi_e \cdot \rho_{ef} \quad (6)$$

$$\rho_{ma} = \rho_{map} \cdot V_{pt} + \rho_{man} \cdot V_{nt} \quad (7)$$

Then the density response can be written as:

$$\rho_b = \rho_{ma} - \phi_e(\rho_{map} - \rho_{ef}) \quad (8)$$

and porosity is computed as:

$$\phi_e = \frac{\rho_{ma} - \rho_b}{\rho_{map} - \rho_{ef}} \quad (9)$$

Similarly, the acoustic log response will be:

$$\Delta t = \Delta t_{ma} - \phi_e(\Delta t_f - \Delta t_{map}) \quad (10)$$

Then:

$$\phi_e = \frac{\Delta t - \Delta t_{ma}}{\Delta t_f - \Delta t_{map}} \quad (11)$$

Thus, if a reservoir contains porous and non-porous components, the computation of effective porosity from a density or acoustic log requires knowledge not only of the average matrix density or average matrix travel time of the component mixture in the formation, but also the average matrix density or average matrix travel time of only the porous components as shown in eq. (9) and (11).

When non-porous material is present in the reservoir, the use of equation (1) to compute porosity from the density log using the average grain density leads to an overestimation of porosity if gypsum is one of the matrix components, and underestimation of porosity in formations with anhydrite and/or other heavy minerals. The computation of porosity from the acoustic log using the conventional equation 2 usually leads to negligible error when either gypsum or anhydrite is present.

It is more complicated to compute the theoretical neutron log response since the neutron response to a matrix of porous components, such as sandstone and dolomite, is a function of a reservoir porosity. Thus, using the neutron-density crossplot (FIG. 1), the neutron log response was first found (assuming Sw=100%) as a second degree polynomial function of porosity for sand ($\phi_{ns}$) and as a third degree polynomial function of porosity for dolomite ($\phi_{nd}$). For limestone, the neutron response ($\phi_{nl}$) is equal to porosity.

Laminated and dispersed types of distribution of non-porous materials have different effects on neutron response. For a laminated distribution of anhydrite and gypsum the response can be written as:

$$\phi_n = \phi_{ns} \cdot V_s + \phi_{nd} \cdot V_d + \phi_{nmg} \cdot V_g + \phi_{nma} \cdot V_a \quad (12)$$

Where $$V_s + V_l + V_d + V_g + V_a = 1 \quad (13)$$

For a dispersed distribution of gypsum and anhydrite the neutron responses to sand and dolomite matrices ($\phi_{nms}$ and $\phi_{nmd}$) are determined as polynomial functions of porosities computed as follows:

$$\phi = \phi_e + \phi_{nmg} \cdot V_g + \phi_{nma} \cdot V_a \quad (14)$$

Then the neutron response will be:

$$\phi_n = \phi_e + \phi_{nms} \cdot V_s + 0 \cdot V_l + \phi_{nmd} \cdot V_d + \phi_{nmg} \cdot V_g + \phi_{nma} \cdot V_a \quad (15)$$

where:

$$V_s + V_l + V_d + V_g + V_a + \phi_e = 1 \quad (16)$$

Then the hydrocarbon bearing reservoirs, the neutron log response is computed as:

$$\phi_n = \phi_n - \phi_e \cdot (1 - HI_f) \quad (17)$$

The photoelectric absorption response, Pe, was computed from volumetric absorption index U.

The theoretical response values for $\rho_b$, $\phi_n$, $\Delta_t$ and Pe described above were used to check the validity of interpretation methods discussed in teh following sections of the paper, and to evaluate possible sources of error in the evaluation of complex reservoirs.

TWO MINERAL SOLUTIONS

For the evaluation of formations containing only two components at least two porosity logs are required. The best approach for the solution of the two-mineral problem is the $\rho_b - \phi_n$ crossplot, since acoustic logs will record lower porosity values than density and neutron logs when there is secondary porosity in the reservoir. Two basic groups of lithologies can be classified at every depth level: limestone+dolomite or limestone+sand. If it is known that there is no limestone in the formation the combination sand+dolomite can be evaluated.

Graphical solutions of the $\rho_b - \phi_n$ crossplot for porosity and lithology are very simple. Porosity is determined at the intersections of the lithology lines and a line drawn through the density-neutron log point parallel to lines connecting equal porosities on the lithology response lines. The distance of the $\rho_b - \phi_n$ logging points along the constructed line from the lithology lines define a lithological composition of the reservoir (FIG. 1). However, analytical solutions of this procedure are not as simple. Methods previously suggested for the determination of lithology and porosity involve the solution of basic log response equations with iterative procedures due to the variable neutron log response to sand and dolomite matrices.

The method proposed here for the two-mineral solution is the mathematical modeling of the graphical solution mentioned above. This method comprises the following steps:

1. The approximate porosity ($\phi_a$) is determined as an average of limestone porosities derived from neutron and density readings.
2. Densities for limestone, dolomite and sand having porosity equal to $\phi_a$ are determined from $$\rho_b = \rho_{mp} - \phi_a(\rho_{mp} - 1) \quad (18)$$

3. The neutron responses for sandstone ($\phi_{ns}$) and dolomite ($\phi_{nd}$) are determined from the $\rho_b - 100_n$ crossplot (FIG. 1) and expressed, respectively, as second and third degree polynomial functions of densities calculated from equation (18). The value for $\phi_{nl}$ is equal to $\phi_a$. These values for density and neutron responses determine the line passing through equal porosity points ($\phi_a$) on the lithology lines.
4. The equation for a line passing through the logging $\rho_b - \phi_n$ point and parallel to the line define in step 3 is formulated.
5. The simultaneous solution of this equation and the lithology line equations will define density and neutron values and equal porosities at the intersections of corresponding lines. To avoid the solution of a third degree polynomial equation for the intersection on the dolomite line, the dolomite line was expressed as two second degree polynomials, one for density less than 2.35 g/cc and one for density greater than 2.35 g/cc.

Now the lithological composition of the reservoir can be found according to the distances of the log point from the lithology lines along the equal porosity line, and the porosity can be found from equation (1). This approach gives exact values for porosity and lithology when compared to the values used to compute density and neutron log responses (see Table 1). The computation of porosity with the assumption that the composition is sandstone-limestone or limestone-dolomite when the actual lithology is a sandstone-dolomite mixture yields errors in porosity of 0.5% or less.

Similar solutions may be developed if it is known that there are different pairs of components present in a reservoir, such as dolomite and gypsum, limestone and gypsum, limestone and anhydrite, etc. For example, consider the dolomite and gypsum combination. A graphical solution for this case is presented in FIG. 1. For the analytical solution the neutron value at the point of intersection of the dolomite line with a line passing through gypsum and the logging points is determined ($\phi_{nd-g}$).

Three values for the neutron response ($\phi_{nd-g}$, $\phi_n$, $\phi_{nmg}$) define the volume of gypsum and the effective porosity can be determined from equation (9). As can be seen from FIG. 1, when the porosity of dolomite is low (below 10%) it is practically impossible to determine the volume of gypsum, since the curve of the dolomite line at low porosities almost coincides with the line connecting gypsum and the logging points. A better solution in this situation can be achieved by methods used for a three-mineral solution.

By a similar approach, the combinations of sand-gypsum, lime-gypsum, sand-anhydrite, and limestone-anhydrite can be resolved. In these cases, good results can be achieved regardless of porosity and gypsum or anhydrite content. However, the combination of anhydrite-dolomite can not always be resolved. Log points with mixtures of anhydrite and dolomite can be located to the left, right, or on top of the dolomite line depending on porosity and anhydrite content. Therefore, it is recommended to evaluate the anhydrite-dolomite combination by methods described below for three-mineral solutions, even when it is known there is only dolomite and anhydrite present in the reservoir.

The volume of halite in combination with either of the three major minerals can be easily determined by a similar approach if there is no gas or light hydrocarbons in the formation.

With the addition of the acoustic log, secondary porosity can be determined as the difference of porosity computed from the density-neutron crossplot and the acoustic log. To compute porosity from an acoustic log, the average matrix travel times for all components ($\Delta t_{ma}$) and for the porous contents of the reservoir ($\Delta t_{map}$) are determined from the lithological composition and effective porosity is found from equation (11).

INFLUENCE OF HYDROCARBONS ON POROSITY COMPUTATION

Although the presence of light hydrocarbons gives a completely distorted view of the lithological characteristics of a reservoir, computations of porosity are not affected to the same degree (see Table 1). When the logging point on the density-neutron crossplot is located between the sand and dolomite lithology lines and the density of hydrocarbons is unknown, the lithology and porosity are computed in the same way as for water-filled reservoirs. If the influence of gas shifts the logging point to the left of the sand lithology line on the density-neutron crossplot, the following technique is applied. Assuming that a gas-bearing reservoir is composed of sandstone alone, apparent fluid density is computed from:

$$\rho_{af} = \frac{(\rho_{mp} \cdot \phi_n)}{(\rho_{mp} - \rho_b + \phi_n)} \quad (19)$$

Then porosity is determined from:

$$\phi_c = \frac{(\rho_{mp} - \rho_b)}{(\rho_{mp} - \rho_{af})} \quad (20)$$

As can be seen from Table 1, this approach gives a maximum error in porosity computation of about 2% for highly porous (30% porosity) hydrocarbon bearing reservoirs. In the presence of oil, porosity can be overestimated and in the presence of gas-underestimated. The lower the porosity of the formation, the smaller the error in porosity computations due to hydrocarbons.

THREE-MINERAL SOLUTION WITH DENSITY, NEUTRON, AND ACOUSTIC LOGS

To determine porosity and lithological content in the presence of three minerals at least three porosity logs, density, neutron, and acoustic, are required, and in most cases a fourth log which measures the photoelectric-absorption index (Pe curve) is also needed. In recent years, the Pe measurement has become available to the logging industry. Previously, the M-N crossplot was the most common method used to determine three-mineral composition. The major disadvantage of this approach is that the acoustic log responds mostly to primary porosity while the density and neutron logs are affected by total porosity.

This application, usefulness, and drawback of the M-N method will be considered first.

M-N CROSSPLOT

If there is no secondary porosity present in a reservoir, the distribution of M and N points on this plot depends primarily on the lithology and matrix characteristics. While the density and acoustic log responses to the matrix elements are independent of reservoir porosity, the neutron response to sand and dolomite matrices is affected by variations in porosity. Therefore, the parameter N is also dependent on porosity for these lithological components (FIG. 2).

For sand, the parameter N can be expressed as a function of porosity by a second degree polynominal, $$N = 0.615 + 0.166\phi_e - 0.279\phi_e^2 \quad (21)$$

and for dolomite, as a third degree polynominal, $$N = 0.516 - 0.472\phi_e + 1.536\phi_e^2 - 1.091\phi_e^3 \quad (22)$$

Porosity must first be estimated (from the density-neutron crossplot, for example) and the parameter N for sand and dolomite computed prior to using the M-N plot.

DETERMINATION OF SAND, LIME, AND DOLOMITE CONTENT

A distribution of M and N points inside the sand-lime-dolomite triangle on the M-N plot indicates these components are present in the formation. The analytical solution for finding the fractions of these elements consists of the following steps:

1. Coordinates M and N of the intersection point of the line connecting sand and limestone and the line passing through dolomite and the logging point are determined (FIG. 3).
2. The distances from the logging point to the point of intersection and the dolomite point indicates the fraction of dolomite in the reservoir.
3. Distances of the point of intersection to the limestone and sand points indicates volumes of these rocks in the space free of dolomite.

These computations yield the volumes of sandstone, limestone, and dolomite with errors of 1–2% and porosity with even smaller errors (0.1–0.2%). However, if there is even a very low percentage of secondary porosity (e.g., 1%) the predictions of lithological composition become greatly distorted (see Table 2). With a further increase in secondary porosity, errors in effective porosity calculations will reach a maximum error of about ±2%. Therefore, in the presence of secondary porosity of M-N technique can yield unreliable predictions of the volume fractions of sand, lime, and dolomite, and greater errors in the computation of porosity than the density-neutron crossplot.

DETERMINATION OF GYPSUM AND ANHYDRITE CONTENT

Three-mineral combinations including gypsum or anhydrite or both, can be resolved from the M-N plot in a similar way as described for sandstone, limestone, and dolomite combinations.

The M-N crossplot is a very useful method for the determination of lithologies such as anhydrite and gypsum, particularly in the case where secondary porosity is less than 2–3%. Computations for gypsum and anhydrite are affected by the presence of secondary porosity, but to a far lesser degree than computations for sand, lime, and dolomite. On the M-N crossplot, secondary porosity shifts point straight up, while gypsum shifts point in a northwesterly direction. Thus if only two minerals, such as dolomite-gypsum or limestone-gypsum are present, both secondary porosity and gypsum can be evaluated.

When three minerals are present in the reservoir, for example gypsum, limestone, and dolomite, then dolomite with secondary porosity can have exactly the same M and N values as limestone (or mixtures of limestone and dolomite) with gypsum. Thus, it must be known apriori whether or not the reservoir contains gypsum or secondary porosity. Calculations can be performed successfully if the formation contains either gypsum or secondary porosity, but not both.

If there is no secondary porosity, the gypsum content an be determined from the M-N plot very accurately with errors no more than 2–3%. Every 1% of secondary porosity add 3–8% of gypsum in the calculations and an average 1% error in porosity computations (Table 2).

If there is no secondary porosity, the anhydrite content can be computed from the M-N plot, but with errors which may exceed 5–10%, considerably worse than the errors obtained in the determination of gypsum. The presence of secondary porosity causes the computed volume of anhydrite to be underestimate by about 5–6% and porosity by about 0.5% for every 1% of secondary porosity.

Since the parameter N is a function of porosity for sand and dolomite, an iterative procedure is necessary to recompute N after porosity is computed to allow a more precise determination of the volumes of gypsum and anhydrite (three iterations are usually sufficient).

ALTERNATIVE METHOD

Because of the errors in computing porosity and lithology from the M-N plot in the presence of anhydrite even when there is no secondary porosity, an alternative approach was developed for gypsum and anhydrite computations. This method, which utilizes density, neutron, and acoustic logs gives approximately the same calculational errors for gypsum as the M-N plot, and yields better results in the presence of anhydrite.

The essence of the method consists of the following: When there is no secondary porosity, the effective porosities computed from the density-neutron crossplot and the acoustic log should be equal. If the porosity from the acoustic log is less than density-neutron porosity, then there is gypsum in the reservoir. On the other hand, if acoustic porosity is greater than density-neutron porosity there is anhydrite in the reservoir. Thus, by equating these porosities, the volume of anhydrite or gypsum can be found as follows:

First, the density-neutron crossplot is solved for a two mineral lithology and $\rho_{map}$ and $\Delta t_{map}$ are determined. Then the following equation is solved for the volume of anhydrite (or gypsum):

$$(\rho_{map}(1-V_a)+\rho_a \cdot V_a-\rho_b)/(\rho_{map} \cdot \rho_{ef})=[\Delta t-(\Delta t_{map} \cdot (1-V_a)+\Delta t_a \cdot V_a)]/(\Delta t_f-\Delta t_{map}) \quad (23)$$

Values of $\phi_n$ and $\rho_b$ are corrected for anhydrite as follows:

$$\phi_{nc}=(\phi_n-\phi_{nma} \cdot V_a)/(1-V_a) \quad (24)$$

and $$\rho_{bc}=(\rho_b-\rho_a \cdot V_a)/(1-V_a) \quad (25)$$

These density and neutron values are used to recompute two-mineral lithology which is then corrected for anhydrite:

$$V_1=V_1(1-V_a), \text{ etc.} \quad (26)$$

The process must be repeated using new values for $\rho_{map}$ and $\Delta t_{map}$ (usually three iterations are sufficient) since they were computed the first time for $\rho_b$ and $\phi_n$ without correcting for the volume of anhydrite. When there is no secondary porosity, the volume of anhydrite and effective porosity are computed with very little error. If there is secondary porosity, the volume of anhydrite is underestimated by about 5% for every 1% of secondary porosity, and effective porosity is computed too low (0.5% for every 1% of secondary porosity, Table 2).

If it is known that instead of anhydrite, the reservoir contains another heavy mineral such as magnetite, hematite, or pyrite) the volume of this mineral and the lithological composition can be determined as described above for the computation of the volume of anhydrite. Both the M-N plot and the method developed here can be applied.

THREE-MINERAL SOLUTIONS WITH DENSITY NEUTRON, ACOUSTIC LOGS AND PHOTOELECTRIC ABSORPTION INDEX (Pe)

As discussed previously, the three-mineral solution using density, neutron, and acoustic logs is very sensitive to the presence of secondary porosity. The situation where the formation has both gypsum and secondary porosity can lead to the most erroneous computations of porosity (Table 2). Thus, it is very important to find a method by which the amount of gypsum, and hence effective porosity can be accurately computed regardless of the presence or absence of secondary porosity. A further improvement in the determination of the lithological composition will, in other cases, also lead to better estimates of porosity, secondary porosity, and permeability. A more accurate determination of the lithological composition of three-mineral reservoirs can be accomplished by the interpretation technique developed here which utilizes acoustic, neutron, and spectral density logs, the latter of which includes measurements of density and the photoelectric absorption index, Pe.

SAND-LIMESTONE-DOLOMITE

This interpretation technique involves the following steps:

1. Using the density-neutron crossplot, the possible maximum and minimum values for dolomite, limestone, and sandstone are determined. If the logging point is located between limestone and dolomite lithology lines the minimum volume of dolomite ($V_{dmn}$) is computed with the assumption that the reservoir is composed of limestone and dolomite. The maximum value for dolomite ($V_{dmx}$) is computed by assuming that the reservoir is composed of sandstone and dolomite. If the logging point is located between sandstone and limestone lithology lines the maximum volume of sandstone ($V_{smx}$) is computed with the assumption of a sand-dolomite composition, and the minimum volume of sandstone is computed by assuming a sandstone-limestone composition.

2. On the basis of lithological composition, porosity is determined (as described for the two-mineral solution). U is computed from the measured Pe and $P_b$ and $U_l$, $U_d$ and $U_s$ are computed from porosity and U values for limestone, dolomite, sand matrices and fluid.

3. For each pair of minerals, maximum and minimum values of U ($U_{mx}$ and $U_{mn}$) are determined. For example, if the logging point is located between the limestone an dolomite lithology lines $U_{mx}$ and $U_{mn}$ are:

$$U_{mx} = U_l \cdot V_l + U_d \cdot V_{dmn} \quad (27)$$

$$U_{mn} = U_s \cdot V_s + U_d \cdot V_{dmx} \quad (28)$$

and the volume of dolomite is determined as $$V_d = V_{dmx} - \frac{(V_{dmx} - V_{dmn})(U - U_{mn-})}{(U_{mx} - U_{mn})} \quad (29)$$

When the point of interest is located between the sandstone and limestone lines the value of $U_{mx}$ and $U_{mn}$ are:

$$U_{mx} = U_s V_{smn} + U_l V_{lmn} \quad (30)$$

$$U_{mn} = U_s V_{smx} + U_d \cdot V_d \quad (31)$$

and the volume of sand may be determined as:

$$V_s = V_{smx} - \frac{(V_{smx} - V_{smn}) \cdot (U - U_{mn})}{(U_{mx} - U_{mn})} \quad (32)$$

4. Having determined the volume of dolomite (or sand) the neutron log response can be corrected for the presence of these components, $$\phi_{nc} = \frac{(\phi_n - V_d \cdot \phi_{nd})}{(1 - V_d)} \quad (33)$$

where $\phi_{nd}$ is the neutron reading on the intersection of the equal porosity line and the dolomite lithology line determined as described for the two-mineral solution.

If there is sand in the formation $\phi_{nc}$ will have a value between $\phi_{ns}$ and $\phi_{nl}$ and the volume of limestone will be $$V_l = \frac{(1 - V_d) \cdot (\phi_{nc} - \phi_{ns})}{(\phi_{nl} - \phi_{ns})} \quad (34)$$

The volume of sandstone is computed as:

$$V_s = 1 - V_l - V_d \quad (35)$$

Lithological composition is found similarly when the point of interest falls between the sand and limestone lithology lines. In this case the neutron response, corrected for sand ($\phi_{nc}$) will fall between the limestone and dolomite lithology lines if there is dolomite in the formation. This method will give lithology and porosity estimates with excellent accuracy.

GYPSUM

If the computed $U_{mn}$ is greater than U, or if $U_{mx}$ is less than U, the presence of either gypsum or anhydrite is indicated. To determine which, the porosity computed from the density-neutron crossplot (two-mineral solution) is compared to the porosity computed from an acoustic log. Acoustic porosity computed higher than density-neutron porosity indicates anhydrite, otherwise the formation contains either gypsum or secondary porosity (or both).

If gypsum is indicated, there can be two possibilities: (1) If U is less than $U_{mn}$ the reservoir is composed of sand, dolomite, and gypsum. (2) If U is greater than $U_{mx}$ the reservoir contains limestone, dolomite, and gypsum. The lithological combination of sand-limestone-gypsum is usually undetectable, especially when there is a considerable amount of sandstone in the formation. In the first situation, where U is less than $U_{mn}$, $V_{smn}$ is determined assuming the formation is composed of sand and dolomite. In this case $V_{gmn}=0$ and $V_{gmx}$ is determined by assuming a sand-gypsum composition. Then, as in previous cases, $U_{mx}$ (for $V_{smn}$ and $V_d$) and $U_{mn}$ (for gypsum and $V_{smx}$) are computed.

$$U_{mx} = U_s \cdot V_{smn} + U_d \cdot V_d \quad (36)$$

$$U_{mn} = U_s \cdot V_{smx} + U_g \cdot V_{gmx} \quad (37)$$

The volume of gypsum is $$V_g = \frac{V_{gmx} \cdot (U_{mx} - U)}{(U_{mx} - U_{mn})} \quad (38)$$

The neutron log is corrected for gypsum to give values of neutron porosity which would be recorded if no gypsum were present in the formation.

$$\phi_{nc} = \frac{(\phi_n - V_g \cdot \phi_{nmg})}{(1 - V_g)} \quad (39)$$

Then the volumes of sand and dolomite are determined as:

$$V_s = \frac{(1-V_g)\cdot(\phi_{nd-g}-\phi_{nc})}{(\phi_{nd-g}-\phi_{ns-g})} \quad (40)$$

$$V_d = 1 - V_s - V_g \quad (41)$$

Analogously, the volumes of limestone, dolomite and gypsum are determined when $U > U_{mx}$.

The accuracy of the computation of the volume of gypsum by this method depends on the lithological composition and effective porosity of a reservoir. The error is small (0–3%) for the limestone-dolomite-gypsum combination regardless of the porosity value, and for the sandstone-dolomite-gypsum combination of porosities above 10%. For a two-mineral composition (gypsum and any porous component) computational results are excellent (Table 3).

ANHYDRITE

Since the volume of anhydrite can be underestimated in the three-mineral solution utilizing density, neutron and acoustic logs, including the Pe measurement in computations of the anhydrite volume is desirable. However, the utilization of the Pe curve in a manner similar to the use in the computation of gypsum content is not always possible, since a line passing through the anhydrite point and the logging points ($\rho_b$ $\phi_n$) will not always intersect the lithology lines when the logging point falls between the limestone and dolomite lines. In this case, the volume of anhydrite can be determined through an iteration process in the following manner.

Density and neutron logs are corrected for the volume of anhydrite which is estimated from density, neutron, and acoustic logs. The volumes of limestone and dolomite are estimated from a density-neutron crossplot using the new values of $\rho_b$ and $\phi_n$. $U_{mn}$ is computed for this lithological composition and compared with U derived from the measured Pe. If $U > U_{mn}$ then a small amount of anhydrite is added and the entire process repeated until $U = U_{mn}$. This approach gives good results for the limestone-dolomite-anhydrite combination, or for anhydrite and one porous component, but for the sandstone-dolomite-anhydrite combination the error can be very large (Table 3).

The same approach can be used to estimate the contents of other heavy minerals, such as hematite, magnetite, etc.

HALITE

Density-neutron log responses to halite beds can sometimes look similar to those of reservoirs with a high gas content. Since halite has a relatively high Pe (4.169) it can be easily distinguished from gas in sandstone or dolomite formations. However, a limestone reservoir with gas can have Pe values close to those of halite. In this case, visual examination of other logs can help to identify halite, which is usually characterized to deep washouts and very high resistivity.

DETERMINATION OF HYDROCARBON DENSITY

The presence of gas or light oil in a complex reservoir can seldom be identified from density and neutron log responses if the reservoir is composed of more than one mineral. The utilization of the Pe curve, in combination with the density-neutron crossplot, can provide an estimate of hydrocarbon density and lithology if the reservoir consists of two known minerals. Consider, for example, a gas saturated limestone-dolomite reservoir. In this case, the density-neutron crossplot will indicate more limestone in the reservoir than is actually there, but the porosity will be very close to the real value as stated previously. The true volume of limestone and dolomite may be found from $$V_l U_l + (1 - V_l) U_d = U \quad (42)$$

$$V_d = 1 - V_l \quad (43)$$

For a water-filled reservoir of this composition and porosity, the density and neutron log responses are:

$$\phi_{nw} = V_l \cdot \phi_{nl} + V_d \cdot \phi_{nd} \quad (44)$$

$$\rho_{bw} = V_l \cdot \rho_{bl} + V_d \cdot \rho_{bd} \quad (45)$$

On the other hand:

$$\phi_{nw} = \phi_e + \phi_{nm} \quad (46)$$

$$\phi_{nh} = \phi_e \cdot HI_f + \phi_{nm} \quad (47)$$

$$\phi_{nw} - \phi_{nh} = \phi_e(1 - HI_f) \quad (48)$$

$$HI_f = 1 - (\phi_{nw} - \phi_{nh})/\phi_e \quad (49)$$

Similarly, $$\rho_{bw} = \rho_{ma}(1 - \phi_e) + \phi_e \cdot \rho_w \quad (50)$$

$$\rho_{bh} = \rho_{ma}(1 - \phi_e) + \phi_e \cdot \rho_{ef} \quad (51)$$

$$\rho_{ef} = \rho_w - (\rho_{bw} - \rho_{bh})/\phi_e \quad (52)$$

After computing water saturation ($S_w$), $HI_h$ and $\rho_{eh}$ can be determined.

$$HI_h = (HI_f - S_w)/(1 - S_w) \quad (53)$$

$$\rho_{eh} = (\rho_{ef} - S_w \rho_w)/(1 - S_w) \quad (54)$$

From here the density of gas can be found by utilizing the equations of Gaymard and Poupon given in "Response of Neutron and Formation Density Logs in Hydrocarbon Bearing Formations" *THE LOG ANALYST*, September–October 1968.

LOG INTERPRETATION EXAMPLE

Results of log interpretation utilizing the methods developed for three-mineral solutions are presented in FIG. 4. This computerized log analysis was performed twice: first by using density, neutron and acoustic logs (FIG. 4a) and then by using these three porosity logs plus the $P_e$ index (FIG. 4b).

In the first case the difference in porosity obtained from the density-neutron crossplot and the acoustic log was interpreted as secondary porosity, although it could also be due to the presence of undetected gypsum.

Interpretation including the $P_e$ curve (FIG. 4b) indicated that in the interval shown, both secondary porosity and gypsum are developed and that secondary porosity is present only in places where there is no gypsum.

NOMENCLATURE $HI_f$—hydrogen index of fluid $HI_h$—hydrogen index of hydrocarbons
$P_e$—photoelectric absorption index
$S_w$—water saturation
U—photoelectric absorption index per unit/vol.
$U_d$, $U_l$, $U_s$, $U_g$—U for dolomite, limestone, sand, gypsum
$U_{mn}$, $U_{mx}$—minimum, maximum values for U
$V_a$, $V_g$, $V_d$, $V_l$, $V_s$—volumes of anhydrite, gypsum, dolomite, limestone, sandstone
$V_{amn}$, $V_{gmn}$, $V_{dmn}$, $V_{lmn}$, $V_{smn}$—minimum values for the above rocks
$V_{amx}$, $V_{gmx}$, $V_{dmx}$, $V_{lmx}$, $V_{smx}$—maximum values for the above rocks
$V_n$, $V_p$—volumes of individual non-porous, porous components
$V_{nt}$, $V_{pt}$—total volumes of non-porous, porpous components
$\Delta t$—acoustic travel time, acoustic log response, sec/ft, sec/m
$\Delta t_a$—acoustic travel time in anhydrite, sec/ft, sec/m
$\Delta t_f$—acoustic travel time in fluid, sec/ft, sec/m
$\Delta t_{ma}$, $\Delta t_{map}$—average matrix travel times of all components, sec/ft, sec/m
$\rho_a$—density of anhydrite, g/cm$^3$
$\rho_{af}$—apparent density of fluid, g/cm$^3$
$\rho_b$—bulk density, density log response, g/cm$^3$
$\rho_{ef}$, $\rho_{eh}$—electron densities in fluid, hydrocarbons, g/cm$^3$
$\rho_{ma}$, $\rho_{man}$, $\rho_{map}$—average matrix densities of all components, non-porous, porous components of a rock, g/cm$^3$
$\rho_{mn}$, $\rho_{mp}$—matrix densities of individual non-porous, porous components of a rock, g/cm$^3$
$\rho_w$—density of water, g/cm$^3$
$\phi_a$, $\phi_e$, $\phi_m$, $\phi_s$—approximate, effective, maximum secondary porosities
$\phi_n$—neutron log response in limestone porosity units
$\phi_{nc}$—corrected neutron log response
$\phi_{nd}$, $\phi_{nl}$, $\phi_{ns}$—neutron log responses to porosity and dolomite, limestone, sand matrices
$\phi_{nd-g}$, $\phi_{nl-g}$, $\phi_{ns-g}$—neutron porosities at the intersections of dolomite, limestone and sandstone lithology lines with the line passing through gypsum and log points
$\phi_{nh}$, $\phi_{nw}$—neutron log response to hydrocarbon bearing, water bearing reservoirs
100 $_{nm}$—neutron log response to a matrix
$\phi_{nma}$, $\phi_{nmg}$—neutron log response to anhydrite, gypsum.

The foregoing techniques have been described with respect to graphical examples and illustrations. It will be appreciated by those skilled in the art that it would be impractical to implement such well log analysis techniques by hand computations in a production environment. The techniques of the present invention may therefore lend themselves to machine implementation in the form of programs which can be used on a general purpose digital computer. Such programs may be developed by those skilled in the art from the foregoing descriptions in a high level computer language such as FORTRAN on a general purpose computer such as a Model MV-8000 computer as produced by the Data General Corporation. Other such general purpose systems could be used if desired.

The foregoing descriptions may make other alternative embodiments of the techniques and methods of the present invention apparent to those of skill in the art. The aim of the appended claims is to cover all such changes and modifications as fall within the true spirit and scope of the invention.

TABLE I

TEST RESULTS OF TWO-MINERAL SOLUTION - $\rho_b$-$\phi_n$ CROSSPLOT

| INPUT | | | | | | OUTPUT | | | |
|---|---|---|---|---|---|---|---|---|---|
| $\phi_e$ | $\rho_{eh}$ | $S_w$ | $V_s$ | $V_l$ | $V_d$ | $\phi_e$ | $V_s$ | $V_l$ | $V_d$ |
| .3 | — | 1.0 | .4 | .6 | 0 | .3 | .398 | .602 | 0 |
| .2 | — | 1.0 | 0 | .7 | .3 | 0.2 | 0 | .703 | .297 |
| .3 | — | 1.0 | .3 | 0 | .7 | .298 | 0 | .447 | .553 |
| .2 | — | 1.0 | .2 | .3 | .5 | .199 | 0 | .588 | .412 |
| .1 | — | 1.0 | .7 | 0 | .3 | .10 | 0 | .967 | .033 |
| .3 | — | 1.0 | .3 | .3 | .4 | .298 | 0 | .745 | .255 |
| .3 | .2 | .2 | .3 | .7 | 0 | .299 | 1.0 | 0 | 0 |
| .2 | .1 | .2 | .3 | .7 | 0 | .188 | 1.0 | 0 | 0 |
| .2 | .2 | .2 | 0 | 0 | 1.0 | .196 | 0 | .999 | .001 |
| .3 | .7 | .2 | 0 | .5 | .5 | .313 | 0 | .696 | .304 |
| .3 | .1 | .2 | 0 | 0 | 1.0 | .276 | 1.0 | 0 | 0 |
| .2 | .1 | .2 | 0 | 0 | 1.0 | .19 | .610 | .390 | 0 |
| .3 | .7 | .3 | 0 | 0 | 1.0 | .312 | 0 | .153 | .847 |
| .3 | .7 | .2 | 0 | 1.0 | 0 | .316 | .442 | .558 | 0 |

TABLE II

TEST RESULTS OF THREE-MINERAL SOLUTION - WITH DENSITY, NEUTRON, AND ACOUSTIC LOGS (M-N and New Method)

| | INPUT | | | | | | | OUTPUT | | | | | |
|---|---|---|---|---|---|---|---|---|---|---|---|---|---|
| METHOD | $\phi_e$ | $\phi_s$ | $V_s$ | $V_l$ | $V_d$ | $V_g$ | $V_a$ | $\phi_e$ | $V_s$ | $V_l$ | $V_d$ | $V_g$ | $V_a$ |
| M-N | .3 | 0 | .3 | .3 | .4 | 0 | 0 | .302 | .279 | .296 | .425 | 0 | 0 |
| M-N | .3 | .01 | .3 | .3 | .4 | 0 | 0 | .299 | 0 | .729 | .271 | 0 | 0 |
| M-N | .3 | .05 | .3 | .3 | .4 | 0 | 0 | .281 | 0 | 1.0 | 0 | 0 | 0 |
| M-N | .18 | 0 | .3 | .3 | 0 | .4 | 0 | .172 | .308 | .257 | 0 | .435 | 0 |
| NEW | .18 | 0 | .3 | .3 | 0 | .4 | 0 | .18 | .265 | .328 | 0 | .406 | 0 |
| M-N | .18 | .01 | .3 | .3 | 0 | .4 | 0 | .157 | .514 | 0 | 0 | .486 | 0 |
| NEW | .18 | .01 | .3 | .3 | 0 | .4 | 0 | .168 | .406 | .147 | 0 | .447 | 0 |
| M-N | .18 | 0 | 0 | .3 | .3 | .4 | 0 | .176 | 0 | .297 | .289 | .414 | 0 |
| NEW | .18 | 0 | 0 | .3 | .3 | .4 | 0 | .177 | 0 | .309 | .284 | .408 | 0 |
| M-N | .18 | .01 | 0 | .3 | .3 | .4 | 0 | .168 | 0 | .317 | .245 | .438 | 0 |
| NEW | .18 | .01 | 0 | .3 | .3 | .4 | 0 | .169 | 0 | .336 | .233 | .431 | 0 |
| M-N | .18 | 0 | .3 | .3 | 0 | 0 | .4 | .202 | .246 | .226 | 0 | 0 | .528 |
| NEW | .18 | 0 | .3 | .3 | 0 | 0 | .4 | .181 | .243 | .358 | 0 | 0 | .399 |
| M-N | .18 | 0 | 0 | .3 | .3 | 0 | .4 | .193 | 0 | .247 | .231 | 0 | .522 |
| NEW | .18 | 0 | 0 | .3 | .3 | 0 | .4 | .18 | 0 | .3 | .3 | 0 | .4 |
| M-N | .18 | .01 | 0 | .3 | .3 | 0 | .4 | .187 | 0 | .268 | .271 | 0 | .461 |
| NEW | .18 | .01 | 0 | .3 | .3 | 0 | .4 | .175 | 0 | .321 | .325 | 0 | .355 |

TABLE III

TEST RESULTS OF THREE-MINERAL SOLUTION
WITH DENSITY, NEUTRON, ACOUSTIC, AND Pe LOGS

| INPUT | | | | | | OUTPUT | | | | | |
|---|---|---|---|---|---|---|---|---|---|---|---|
| $\phi_e$ | $V_s$ | $V_l$ | $V_d$ | $V_g$ | $V_s$ | $\phi_e$ | $V_s$ | $V_l$ | $V_d$ | $V_g$ | $V_a$ |
| .3 | .3 | .3 | .4 | 0 | 0 | .3 | .297 | .302 | .401 | 0 | 0 |
| .1 | .3 | .3 | .4 | 0 | 0 | .1 | .3 | .3 | .4 | 0 | 0 |
| 0 | .3 | .3 | .4 | 0 | 0 | 0 | .299 | .297 | .404 | 0 | 0 |
| .18 | .3 | 0 | .3 | .4 | 0 | .173 | .305 | 0 | .270 | .425 | 0 |
| .06 | .3 | 0 | .3 | .4 | 0 | .078 | .284 | 0 | .374 | .342 | 0 |
| .18 | 0 | .3 | .3 | .4 | 0 | .177 | 0 | .298 | .289 | .413 | 0 |
| .06 | 0 | .3 | .3 | .4 | 0 | .059 | 0 | .3 | .296 | .404 | 0 |
| .06 | .6 | 0 | 0 | .4 | 0 | .06 | .6 | 0 | 0 | .4 | 0 |
| .06 | 0 | 0 | .6 | .4 | 0 | .06 | 0 | 0 | .6 | .4 | 0 |
| .18 | 0 | .3 | .3 | 0 | .4 | .181 | 0 | .294 | .296 | 0 | .41 |
| .06 | 0 | .3 | .3 | 0 | .4 | .061 | 0 | .299 | .291 | 0 | .41 |
| .18 | .3 | 0 | .3 | 0 | .4 | .193 | .008 | 0 | .782 | 0 | .21 |
| .06 | .3 | 0 | .3 | 0 | .4 | .078 | .033 | 0 | .747 | 0 | .22 |

I claim:

1. A machine implemented iterative method of well log analysis to determine the volumes of anhydrite (or gypsum) in three mineral combination lithology utilizing well log measurements of gamma-gamma density, neutron and acoustic properties of earth formations in the vicinity of a well borehole comprising the steps of:

(a) obtaining a gamma-gamma density versus neutron porosity crossplot from the respective logs at a corresponding depth in the well borehole;

(b) determining $\rho_{map}$ (the average density of rock matrix) and $\Delta t_{map}$ (the average matrix acoustic travel time) by solving said crossplot for a two mineral lithology;

using the $\rho_{map}$ and $\Delta t_{map}$, then determining the volume of anhydrite (or gypsum) present from the relationship given by $$(\rho_{map}(1-V_a)+\rho_a \cdot V_a-\rho_b)/(\rho_{map}-\rho_{ef})=[\Delta t-(\Delta t_{map})(1-V_a)+\Delta t_a \cdot V_a)]/(\Delta t_f-\Delta t_{map})$$

where $V_a$ is the volume of anhydrite in the formation; $\rho_a$ is the density of anhydrite; $\rho_b$ is the bulk density from the density log response; $\rho_{ef}$ is the electron density of the formation fluid; $\Delta t$ is the acoustic travel time from the acoustic log response; $\Delta t_a$ is the acoustic travel time of anhydrite; and $\Delta t_f$ is the acoustic travel time in the formation fluid;

(c) using the $V_a$ just computed, recompute the two mineral lithology volume for $V_l$ (volume of limestone) from the relationship $$V_l = V_l'(1-V_a),$$

and;

repeating steps (b) and (c) using new values of $\rho_{map}$ and $\Delta t_{map}$ in an interative manner until the corrected values of $V_a$ do not vary from repetition to repetition by more than a predetermined amount, thereby arriving at a value of $V_a$.

2. A machine implemented method of well log analysis to determine earth formation properties of porosity, secondary porosity and the volumes of sandstone, limestone, dolomite, gypsum and anhydrite in three mineral combination lithology utilizing gamma-gamma density, neutron, acoustic, and photoelectric absorption index Pe, properties of earth formations in the vicinity of a well borehole, comprising the steps of:

(a) obtaining in a well borehole gamma-gamma density, neutron, acoustic and photoelectric absorption index Pe measurements of earth formation properties in the vicinity of the well borehole;

(b) using a gamma-gamma density versus neutron porosity crossplot determine the possible maximum and minimum values for dolomite, limestone and sandstone;

(c) on the basis of the computed lithological composition determine the porosity as in a two mineral solution;

(d) determine U (photoelectric absorption index per unit volume) from the measured Pe and $\rho_b$ (bulk density);

(e) determine $U_e$ and $U_d$ and $U_s$ (photoelectric absorption index per unit volume for limestone, dolomite and sand) from porosity and known U values;

(f) for each pair of minerals determine maximum and minimum values of U and determine the volume of dolomite or sand $V_d$ or $V_s$;

(g) correct the neutron log response for the presence of dolomite (or sand) using the relationship $$\phi_{nc} = \frac{(\phi_n - V_d \cdot \phi_{nd})}{(1 - V_d)}$$

where $\phi_n$ is the measured neutron porosity response: $\phi_{nd}$ is the neutron log response to dolomite;

(h) determine the volume fraction of limestone from the relationship $$V_l = \frac{(1 - V_d) \cdot (\phi_{nc} - \phi_{ns})}{(\phi_{nl} - \phi_{ns})}$$

where $\phi_{ns}$ is the neutron log response to sandstone and $\phi_{nl}$ is the neutron log response to limestone;

(i) determine the volume fraction of sandstone $V_s$ from the relationship $$V_s = 1 - V_l - V_d.$$

3. A machine implemented method of well log analysis for determining the density of hydrocarbons in a complex reservoir in earth formations penetrated by a well borehole using density, neutron and Pe photoelectric absorption index measurements made in the borehole, comprising the steps of:

(a) obtaining well log measurements in a well borehole of the response of reservoir rocks to gamma-gamma density, neutron and photoelectric absorption index measuring systems;

(b) determine the voluem of limestone $V_l$ and dolomite $V_d$ in the reservoir from the relationship $$U = V_l \cdot V_l + (1 - V_l) \cdot U_d \text{ where}$$

$$V_d = 1 - V_l$$

U is the measured photoelectric absorption index; $U_l$ is the measuring system response in pure limestone; $U_d$ is the measuring system response in pure dolomite;

(c) determine the density $\rho_{bw}$ and neutron $\phi_{nw}$ log responses for this composition reservoirs from the relationships $$\phi_{nw} = V_l \cdot \phi_{nl} + V_d \cdot \phi_{nd}$$

$$\rho_{bw} = V_l \cdot \phi_{bl} + V_d \cdot \phi_{bd}$$

where
- $\phi_{nl}$ is the neutron log response in limestone
- $\phi_{nd}$ is the neutron log response in dolomite;
- $\rho_{bl}$ is the density log response in limestone;
- $\rho_{bd}$ is the density log response in dolomite;

(d) determine the neutron log response $\phi_{nw}$ to a water or response $\phi_{nh}$ to a hydrocarbon bearing reservoir using the relationship $$\phi_{nw} = \phi_e + \phi_{nm}$$

$$\phi_{nh} = \phi_e \cdot HI_f + \phi_{nm}$$

where
- $\phi_e$ is the effective porosity;
- $HI_f$ is the hydrogen index of the fluid; and $\phi_{nm}$ is the neutron log response to a rock matrix and where $$\phi_{nw} - \phi_{nh} = \phi_e(1 - HI_f)$$

$$HI_f = 1 - (\phi_{nw} - \phi_{nh})/\phi_e$$

(e) similarly, develop the density log responses $\rho_{bw}$ (response to water bearing reservoir), $\rho_{bh}$ (response to hydrocarbon bearing reservoir) and $\rho_{ef}$ (electron density of fluid) using the relationships $$\rho_{bw} = \rho_{ma}(1 - \phi_e) + \phi_e \cdot \rho_w$$

$$\rho_{bh} = \rho_{ma}(1 - \phi_e) + \phi_e \cdot \rho_{ef}$$

$$\rho_{ef} = \rho_w - (\rho_{bw} - \rho_{bh})/\phi_e$$

where $\rho_w$ is the density of water and the other terms are as defined;

(f) determine from resistivity mesurements the water saturation $S_w$ of the reservoir and then determine from the following relations $HI_h$ (the hydrogen index of hydrocarbons in the reservoir) and $\rho_{eh}$ (the electron density of the reservoir hydrocarbons)

$$HI_h = (HI_f - S_w)/(1 - S_w)$$

$$\rho_{eh} = (\rho_{ef} - S_2 \cdot \rho_w)/(1 - S_w).$$

* * * * *